United States Patent [19]

Weidler, Jr. et al.

[11] 4,058,984
[45] Nov. 22, 1977

[54] MARINE CUSHIONING UNIT

[75] Inventors: Jay B. Weidler, Jr., Houston; Charles Warren Stelly, Kingwood, both of Tex.

[73] Assignee: Brown & Root, Inc., Houston, Tex.

[21] Appl. No.: 697,411

[22] Filed: June 18, 1976

[51] Int. Cl.² .............................................. E02B 3/22
[52] U.S. Cl. .......................................... 61/48; 114/219
[58] Field of Search ................... 61/48, 104; 114/219; 267/139, 140, 141; 256/1, 13.1; 293/88

[56] References Cited

U.S. PATENT DOCUMENTS

| | | | |
|---|---|---|---|
| 3,172,268 | 3/1965 | Genshelmer | 267/139 X |
| 3,533,242 | 10/1970 | Narabu | 61/48 |
| 3,564,858 | 2/1971 | Pagonowski | 61/48 |
| 3,600,896 | 8/1971 | Tateisi | 267/140 X |
| 3,694,018 | 9/1972 | Levering | 293/88 |
| 3,763,653 | 10/1973 | Shirvany | 61/48 X |

Primary Examiner—Dennis L. Taylor
Attorney, Agent, or Firm—Kenway & Jenney

[57] ABSTRACT

Disclosed is an apparatus for cushioning and absorbing force between relatively moving bodies and for dissipating the impact energy, preferably in a marine environment. The apparatus is securable to a structure in a marine environment and typically cushions the impact between a marine means (i.e., barge, boat, etc.) and that structure. The apparatus comprises an upright frame, laterally spaced apart upper shock mounts securing the frame to the structure. Each of the shock mounts includes a shear-type, shock-absorbing, resiliently-deformable member disposed intermediate the upright frame and the structure to which it is secured. The resiliently-deformable members of the upper shock mounts are disposed in an orientation in which they provide both compressive and shear resistance to horizontal loading on the frame. The resiliently-deformable members of the lower shock mounts are disposed to support a major portion of the vertical weight of the frame with compressive resistance, while providing shear resistance to horizontal loading on the frame.

15 Claims, 7 Drawing Figures

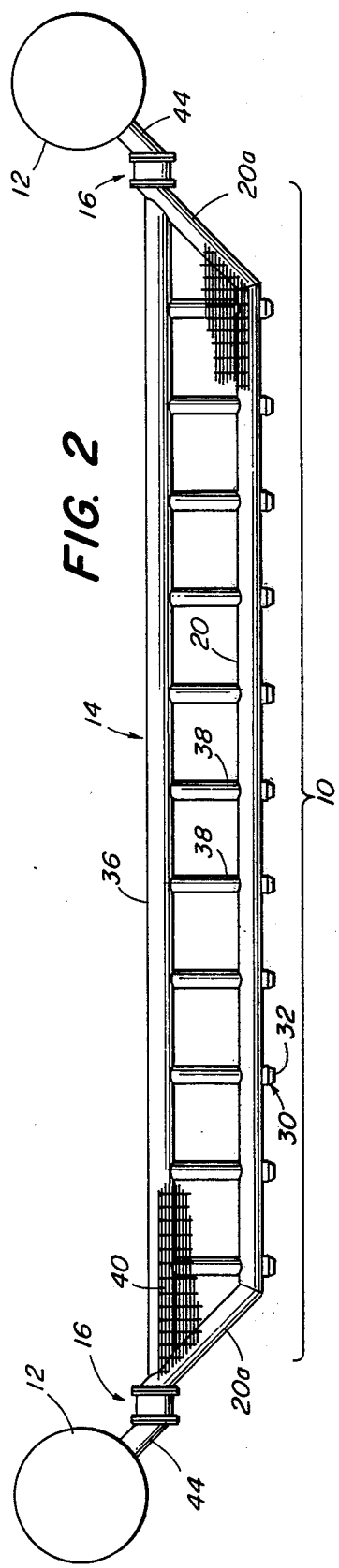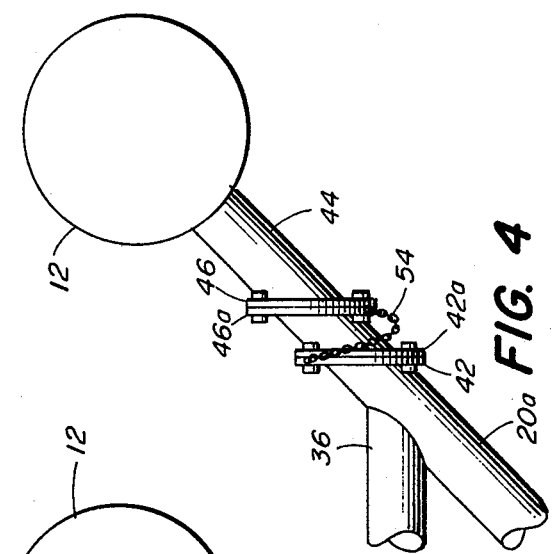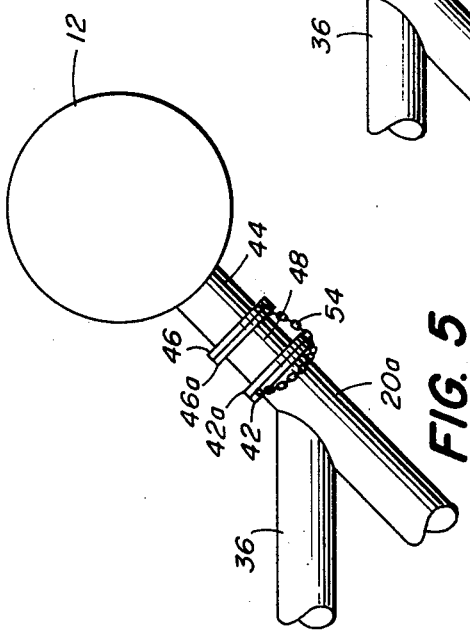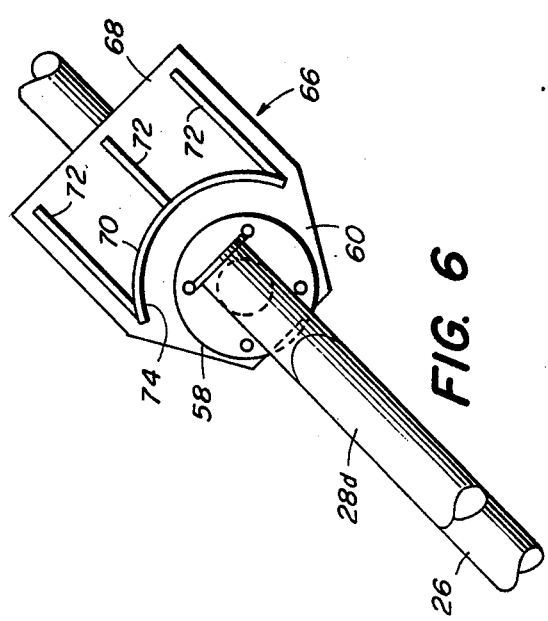

MARINE CUSHIONING UNIT

BACKGROUND OF THE INVENTION

The present invention relates to apparatus for dissipating impact energy between relatively converging members. A typical environment of usage of such apparatus is a marine environment in which the apparatus is employed to cushion the impact between a marine means (e.g., barge, boat, etc.) and a second structure (e.g., another marine means or a fixed tower, wharf, etc.)

Many forms of protective fender or bumper systems have been proposed, for both onshore and offshore locations, to dissipate kinetic energies imparted, for example, from a floating vessel to a relatively stationary structure such as a mooring or berthing facility. Prior systems have ranged from the simple expedient of worn tire casing nailed to a pier to such highly engineered cushioning systems as the unit described in Dial et al. U.S. Pat. No. 3,864,922 entitled "Sealed Cushioning Unit", issued Feb. 11, 1975. Of course, the desirability of either of these two extremes, or of any of the many other devices proposed, is often determined by both the expense of installation and maintenance and the particular impact situations anticipated in a given environment.

Many suggested cushioning units have included a relatively rigid member for contacting a floating vessel, that member secured to a pier, mooring, etc. through a deformable elastomeric member. The elastomeric member is positioned to be deformed upon impact of the floating vessel with the relatively rigid member, thereby absorbing impact energy. A number of units employing deformable elastomeric members as a cushioning element have provided for shear-type deformation of the elastomeric element as part of the suchioning strategy. Examples of such units can be found in the following references: Wanneroy U.S Pat. No. 3,457,729; Slemmons U.S. Pat. No. 3,055,182; Shirvany U.S. Pat. No. 3,763,653; Hein U.S. Pat. No. 3,235,244; Kinneman U.S. Pat. No. 2,655,005; and a publication of Regal Tool & Rubber Co., Inc., Box 1723 Corsicana Tex., entitled "Barge and Boat Bumpers for Offshore Platforms".

Other units have included the proposal of multiple, horizontally-spaced shock absorbing supports for a single frameline member disposed to contact the floating vessel. Such arrangements can be found in: Von-Bose et al. U.S. Pat. No. 3,933,111; Tummers et al. U.S. Pat. No. 3,890,916; and Kevar U.S. Pat. No. 3,953,084. Depending upon the particular design features, some such units permit the framelike member to tilt in various orientations in response to forces imparted by a floating vessel, rather than being limited to motion toward, and away from, the wharf to which the shock absorbing units are attached.

Despite the number and variety of previous cushioning unit proposals, unresolved problems have remained, particularly as concerns quite large size suchioning units needed to protect easily damaged marine structures from impact by large, oceangoing barges and boats. Thus, for example, while frame-type units may be desirable to span the distance between spaced apart supports of a marine structure (e.g., the "legs" of an offshore tower), as the scale of the apparatus increases the problem of supporting the vertical weight of such a frame, while still permitting horizontal deflection to be absorbed by shock absorbing units, becomes increasingly vexatious. Additionally, the rupturing of a shock absorbing unit (e.g., owing to wear over a long period of time, sudden excessive loading, etc.), could result in a major components of such a large-scale cushioning unit damaging the structure to which it is affixed, dropping to the body of water, and rendering repair difficult and/or hazardous.

OBJECTS AND SUMMARY OF THE INVENTION

In view of the above discussion, it is a principal object of the present invention to provide an improved cushioning unit of the general type described suitable for use in a marine environment. More particularly, it is an object of the invention to provide such a cushioning unit which is practical to manufacture, install, maintain, and repair even in units of very large size.

To achieve the foregoing and other objects which shall appear hereinafter, the invention is directed to apparatus for cushioning impact between a marine means and a structure to which the apparatus is securable. The apparatus comprises an upright frame, laterally spaced apart upper shock mounts, and laterally spaced apart lower shock mounts. Each of the shock mounts secures the frame to the structure and includes a shear-type, shock-absorbing, resiliently-deformable member disposed intermediate the frame and the structure. The resiliently-deformable members of the upper shock mounts are provided in an orientation in which they provide both compressive and shear resistance to horizontal loading on the frame. The resiliently-deformable members of the lower shock mounts, on the other hand, are disposed to support at least a major portion of the vertical weight of the frame with compressive resistance and also to provide shear resistance to horizontal loading on the frame.

In preferred embodiments of the invention each resiliently-deformable member is substantially circular in cross section, the axes of the resiliently-deformable members of the upper shock mounts being substantially horizontal and the axes of the resiliently-deformable members of the lower shock mounts being substantially vertical. With this arrangement, the resiliently-deformable members of the lower shock mounts support, in compressive resistance, between about 90% and about 95% of the weight of the frame.

It is also preferred to provide deflection limiting means for limiting the maximum deformation of each resiliently-deformable member. For each upper shock mount, the deflection limiting means may be in the form of a flexible elongate member to upper and lower rigid plates, which are in turn secured to opposite surfaces of the resiliently-deformable member, the elongate member having a predetermined length intermediate the points of securement such that it is taut when the plates are at the maximum deflection corresponding to the maximum permissible deformation of the resiliently-deformable member. The deflection limiting means for each lower shock mount may take the form of a rigid stop member that is fixed with respect to the lower plate secured to the resiliently-deformable member and that is disposed to engage the upper plate after a predetermined amount of horizontal movement of that upper plate relative to the lower plate. Preferably, the stop plate has a concave surface for engagement with the upper plate, thereby acting as a stop for horizontal deflections of the upper plate over a range of deflection angles.

The lower shock mounts preferably also include a pin projecting upwardly from the upper plate. Mounting of the frame upon the lower shock mounts is facilitated by providing tubular sockets integral with the frame sized and positioned to receive the pins of the lower shock mounts.

THE DRAWINGS

Preferred embodiments of the present invention are illustrated in accompanying drawings in which:

FIG. 2 is a plan view of the unit of FIG. 1;

Figure 1:
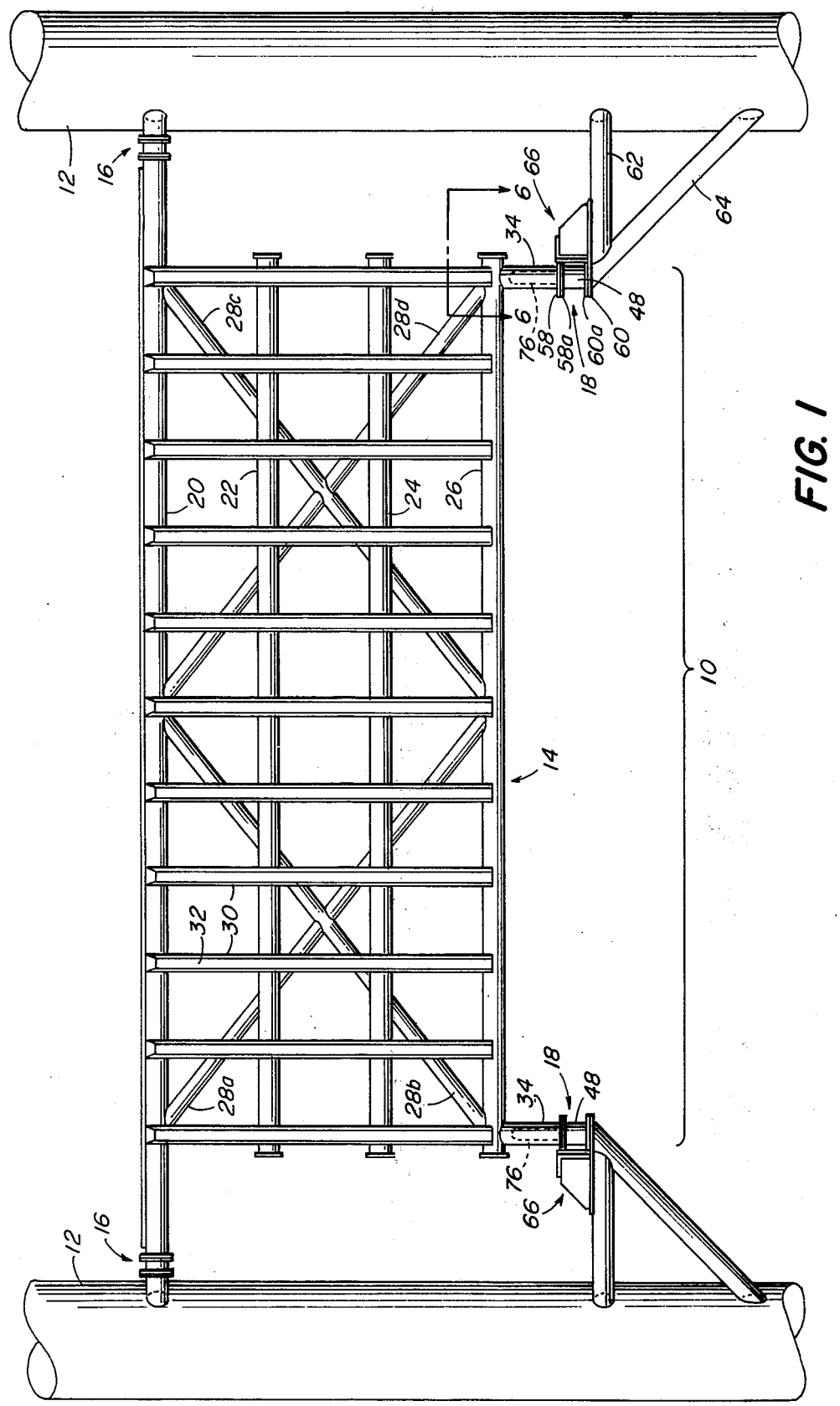
FIG. 1 is a front elevation of a cushioning unit constructed in accordance with the present invention.

FIGS. 4 and 5 are plan views of alternative embodiments of upper shock mounts for use in the unit illustrated in FIGS. 1 and 2; and FIG. 6 is a view taken at 6—6 of FIG. 1 illustrating a lower shock mount of the unit of FIGS. 1 and 2.

DETAILED DESCRIPTION

As mentioned above, a cushioning unit in accordance with the present invention is designed to be suitable for use in spanning relatively large distances between spaced apart portions of a structure to be protected by the cushioning unit. To emphasize this capability, the environment of use illustrated in FIGS. 1 and 2 of a unit 10 according to the present invention is that of an offshore tower that includes spaced apart support legs 12 extending from the floor of a body of water (not shown) to a platform (not shown) above the surface of the body of water. Naturally, there are many other environments of possible use of units constructed in accordance with the present invention. To give an indication of scale of the illustrated embodiment, it may be assumed that the support legs 12 are spaced apart by a distance of the order of 45 feet.

Referring to FIGS. 1 and 2, the unit 10 comprises an upright frame 14, a pair of upper shock mounts 16, and a pair of lower shock mounts 18. As illustrated, the upright frame 14 can comprise an open grid formed from horizontal members 20, 22, 24, and 26; diagonal reinforcing members 28a–28d; and an array of vertically disposed members 30 positioned for actual engagement with a marine means (e.g., a barge or boat). Preferably, the members 30 are formed with a rigid base and an outer layer of a non-abrasive, resilient material 32 (e.g., rubber). At the lateral extremities of the frame 14, downwardly projecting tubular sockets 34 are provided for engagement with the lower shock mounts 18, as further described below. As best seen in FIG. 2, at least at the upper portion thereof the frame 14 has a substantial horizontal depth (e.g., a few feet), which is provided by a second horizontal member 36 aligned with, and parallel to, the member 20 and a series of connecting members 38 extending between the members 20 and 36. Preferably, an open lattice (e.g., a metallic grid having spacing of a couple of inches or less) 40 is secured to the upper surface of the upright frame 14 as defined by the members 20, 36, and 38. This lattice 40 can serve as a boat landing. Naturally, a ladder or stairs (not shown) can be provided to lead from the lattice 40 to the platform of the offshore tower.

The construction and operation of the upper shock mounts 16 may be described with reference to FIGS. 2 and 3. A horizontally disposed, angled end portion 20a of the frame's upper horizontal member 20 terminates in a recessed flange plate 42. A rigid support beam 44, which is welded to a let 12 at one end, terminates in another flange plate 46. A generally cylindrical, resiliently-deformable member 48 is disposed intermediate the flange plates 42 and 46. Suitably recessed flange plates 42a and 46a are clamped to the plates 42 and 46 respectively, by bolts 50 to secure end flange portions 52 of the resiliently-deformable member 48 in the recess as defined by the pairs of plates 42, 42a and 46, 46a. Preferably, a chain 54 (or any other string, flexible elongate member) extends between a pair of anchor rings 56 secured (e.g., welded) to plates 42a and 46a.

Figure 3A:
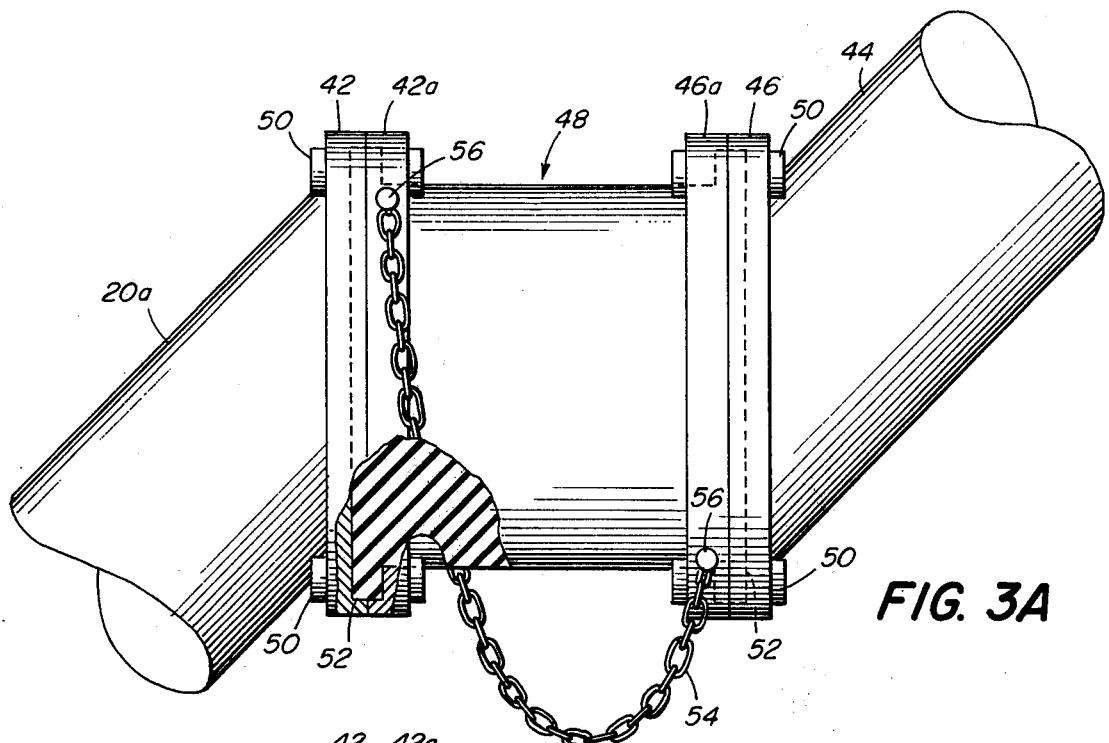
FIGS. 3A and 3B are enlarged plan views of an upper shock mount of the unit of FIGS. 1 and 2 in, respectively, relaxed and stressed conditions.

As will be apparent from FIGS. 1 and 3A, the resiliently-deformable member 48 of the upper shock mount 16 are disposed in a horizontal orientation and with their axes parallel to a reference line drawn between the legs 12 (i.e., generally parallel to the upright frame 14). In this orientation, any support of the vertical weight of the frame 14 by the resiliently-deformable member 48 is in a shear-type resistance. Because of this, as is further described below, the unit 10 is designed such that the lower shock mounts support at least 90% to 95% of the vertical weight of the frame 14, while the upper shock mounts, through the resiliently-deformable members 48, support no more than about between 5% and 10% of the vertical weight of the frame 14.

Figure 3B:
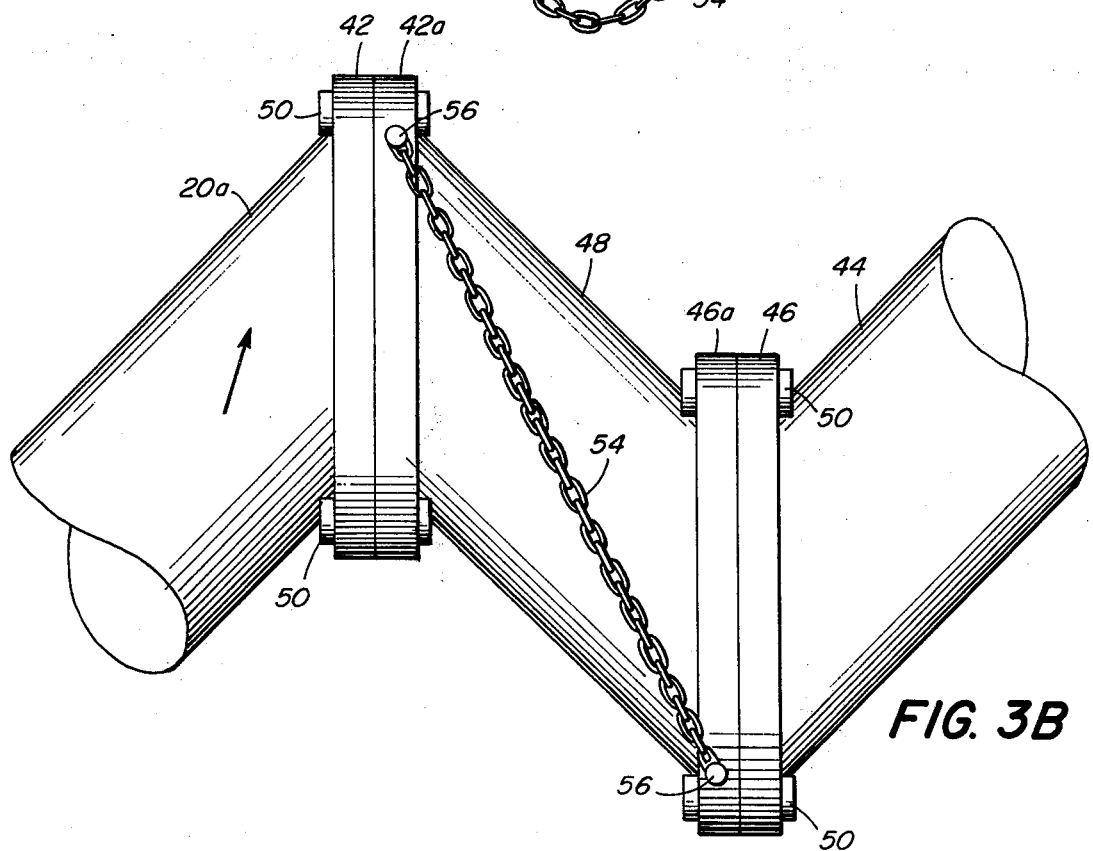

The operation of the upper shock mount 16 can be explained with reference to FIGS. 3A and 3B. FIG. 3A depicts the unstressed condition of the shock mount prior to an impact from a marine means. As is evident, the resiliently-deformable member is in its rest, cylindrical configuration and the chain 54 is slack. An impact of a marine means on the upright frame 14 will cause the member 20a to be deflected in the direction indicated by the arrow of FIG. 3B. The shear-type deformation of the resiliently-deformable member 48, as indicated in FIG. 3B, absorbes the impact energy and thereby protects the legs 12 of the structure from receiving excessive forces. Because a boar or barge will strike a glancing, rather than perpendicular, blow on the frame, the direction of force vectors will result in compressive resistance in the members 48 to horizontal loading on the frame. The chain 54 acts as a deflection limiting means to prevent over-stressing of the resiliently-deformable member 48, which could result in its failure. The taut condition of the chain 54 illustrated in FIG. 3B defines the maximum permitted deflection of the frame 14 with respect to the fixed structure (i.e., leg 12 and member 44), or, equivalently, maximum deflection between the plates 42 and 46. Removal of the impact force, of course, permits the member 48 to return substantially to its original condition as illustrated in FIG. 3A.

Alternative constructions and orientations of elements of the upper shock mounts 16 are illustrated in FIGS. 4 and 5. In FIG. 5, the resiliently-deformable member 48 is again generally cylindrical, but has its axis angled with respect to the vertcial plane of the frame 14 (i.e., angled with respect to the axis of member 36 shown in FIG. 5). In FIG. 4, the member 48 is of circular cross-section but has end faces angled with respect to its own axis. That axis is orientated in a similar manner with respect to the axis of member 36 as is the case in FIG. 5. With each of the embodiments of FIGS. 4 and 5, of course, the resistance to horizontal loading on the frame 14 by the member 48 includes both compressive and shear-type resistance.

The structure and operation of the lower shock mounts 18 can be described with reference to FIGS. 1 and 6. Upper and lower flange plate pairs 58, 58a and 60, 60a retain a cylindrical resiliently-deformable member 48 in the manner indicated in FIG. 3A, but with the axis of the member 48 being vertical. The plate 58 is secured to the tubular socket 34 of the upright frame 14 and the plate 60 is secured to a mounting structure comprising members 62 and 64 secured to each other and to a tower leg 12. A deflection limiting means 66 comprises an extension 68 of the lower plate 60 to which is secured an upright rigid stop member 70 and reinforcing ribs 72 integral with both the member 70 and the plate extension 68. The stop member 70 includes a concave surface 74 facing the upper plate 58 and having a curvature substantially matching that of the circular plate 58. The placement of the surface 74 is chosen such that, as illustrated in FIG. 6, the separation between that surface and the edge of plate 58 in the undeformed, or rest, configuration of the member 48 is equal to the maximum permitted deflection of the upright frame 14 under horizontal loading. The upright frame 14 is mounted on the lower shock mounts 18 by fitting the tubular sockets 34 over upright pins 76 (see FIG. 1) that are integral with the plate 58a.

As is evident from FIG. 1, the resiliently-deformable members 48 of the lower shock mounts 18 are disposed to support the vertical weight of the frame 14 with compressive resistance, while absorbing horizontal loading on the frame 14 with a shear-type resistance in a manner similar to that of the resiliently-deformable members of the upper shock mounts 16.

Since the upper shock mounts 16 are mounted horizontally with respect to the upright frame 14, rather than vertically as is the case with the lower shock mounts 18, the use of chain 54 as a deflection limiting means for the upper shock mounts serves to maintain the large and heavy upright frame 14 in a substantially vertical orientation even if a resiliently-deformable member of an upper shock mount 16 should rupture. This, of course, retains the upright frame 14 in a suitable position for maintenance and repair work and also prevents the frame 14 from toppling and damaging the tower to which it is secured and/or falling to the bed of the body of water in which the tower stands.

SUMMARY OF MAJOR ADVANTAGES OF THE INVENTION

Briefly, a cushioning unit constructed in accordance with the present invention provides the desirable features of a frame-type unit with shock absorbing and frame supporting units in an arrangement that is feasible for even units of very large size. Laterally spaced apart upper and lower shock absorbing units each provide a shear-type resistance to horizontal loading on the frame, while the lower shock units provide a compression-type resistance to supporting major portion of the, often large, weight of the upright frame.

All shock units are preferably provided with deflection-limiting means for protection against over-stressing, and possible rupture, of deformable members of each of the shock units. The frame structure and supporting system facilitates the incorporation into the frame at its upper surface of a boat landing arrangement, as may be highly desirable in certain use environments of the unit (e.g., offshore towers).

The design in which the lower shock mounts support the large majority of the frame's weight, coupled with the pin-and-tubular socket means of engagement of the frame with the lower shock mounts, facilitates installation of the frame even in difficult circumstances (e.g., very large and heavy frames being installed in-offshore locations).

While the invention has been described with reference to a particular embodiment, it will be appreciated by those skilled in the art that additions, deletions, modifications, and substitutions or other changes not specifically described may be made which will fall within the scope of the appended claims.

What is claimed is:

1. Apparatus for cushioning the impact between a marine means and a structure to which the apparatus is securable, the apparatus comprising
    an upright frame,
    laterally spaced apart upper shock mounts securing said frame to said structure, each shock mount including a shear-like shock-absorbing resiliently-deformable member disposed intermediate said frame and said structure in an orientation in which it provides shear resistance to horizontal loading on the frame,
    laterally spaced lower shock mounts securing said frame to said structure, each shock mount including a shear-type shock-absorbing resiliently-deformable member disposed to support at least a major portion of the vertical weight of said frame with compressive resistance and to provide shear resistance to horizontal loading on the frame.

2. The apparatus of claim 1 wherein each said resiliently-deformable member is substantially cylindrical in shape, the axes of the resiliently-deformable members of said upper shock mounts being substantially horizontal and the axes of the resiliently-deformable members of said lower shock mounts being substantially vertical.

3. The apparatus of claim 2 for use with a structure including spaced apart substantially rigid support legs to which said frame is secured through said shock mounts, said frame defining an upright plane generally parallel to a reference plane extending between said support legs.

4. The apparatus of claim 3 wherein the axes of the resiliently-deformable members of said upper shock mounts are disposed at an acute angle with respect to said upright plane.

5. The apparatus of claim 3 wherein the axes of the resiliently-deformable members of said upper shock mounts are disposed substantially parallel to said upright plane.

6. The apparatus of claim 1 wherein each said lower shock mount further comprises a rigid plate adjacent the upper surface of said resiliently-deformable member and a pin secured to said plate and projecting upwardly therefrom, said upright frame including a tubular socket sized to receive said pin.

7. The apparatus of claim 6 wherein each said lower shock mount further comprises a rigid lower plate adjacent the lower surface of said resiliently-deformable member and deflection limiting means for limiting the maximum horizontal movement of said upper plate with respect to said lower plate.

8. The apparatus of claim 7 wherein said deflection limiting means comprise a rigid stop member fixed with respect to said lower plate and disposed to engage said upper plate after a predetermined amount of horizontal movement of said upper plate relative to said lower plate.

9. The apparatus of claim 8 wherein said stop plate has a concave surface for engagement with said upper plate, thereby operative to act as a stop for said upper plate for horizontal deflections thereof with respect to said lower plate over a range of deflection angles.

10. The apparatus of claim 9 wherein said concave surface is in the form of a segment of a cylinder.

11. The apparatus of claim 1 wherein each said shock mount further comprises a first plate secured adjacent one side of said resiliently-deformable member, a second plate secured adjacent the other side of said resiliently-deformable member, and deflection limiting means for limiting the maximum relative deflection between said plates to a predetermined amount.

12. The apparatus of claim 11 wherein each said resiliently-deformable member is generally cylindrical, the axes of the resiliently-deformable members of said upper shock mounts being substantially horizontal and the axes of the resiliently-deformable members of said lower shock mounts being vertical.

13. The apparatus of claim 12 wherein the deflection limiting means of each said upper shock mount comprise a flexible elongate member secured to said first plate and to said second plate and having a predetermined length intermediate those points of securement such that said flexible elongate member is taut when said plates are at said maximum deflection; whereby said deflection limiting means for said upper shock mounts enable said upright frame to be maintained in a generally upright orientation in the event of a breakage of the resiliently-deformable member of an upper shock mount.

14. The apparatus of claim 1 wherein said resiliently-deformable members of said lower shock mounts support between about 90% and about 95% of the vertical weight of said frame, the remaining portion of the vertical weight of said frame being supported by shear resistance of the resiliently-deformable members of said upper shock mounts.

15. The apparatus of claim 1 wherein said upright frame includes a generally horizontal surface at the upper portion of said frame, thereby enabling said frame to serve as a boat landing.

* * * * *